United States Patent [19]
Sotak et al.

[11] 3,783,591
[45] Jan. 8, 1974

[54] POWER MOWER SAFETY MECHANISM

[76] Inventors: John B. Sotak, 122 Church Rd., Irwin, Pa. 15642; Harold A. Williamson, 559 Idlewood Rd., Penn Hills Township, Allegheny County, Pa. 15235

[22] Filed: Dec. 23, 1971

[21] Appl. No.: 211,385

[52] U.S. Cl. .................................. 56/10.2, 56/17.4
[51] Int. Cl. ........................................... A01d 53/00
[58] Field of Search ................... 56/10.2, 10.4, 12.1, 56/17.1, 17.4, 255

[56] References Cited
UNITED STATES PATENTS
3,212,244 10/1965 Wilgus ................................ 56/17.1
3,086,346 4/1963 Zimmermann ...................... 56/17.1

*Primary Examiner*—Louis G. Mancene
*Assistant Examiner*—J. N. Eskovitz

[57] ABSTRACT

This disclosure relates to a rotary type of lawn mower having a skirted housing, a power motor mounted on the housing, a rotary grass cutting blade driven by the power motor, and a blade lifting assembly for selectively raising the rotary blade substantially against the underside of the housing.

12 Claims, 5 Drawing Figures

PATENTED JAN 8 1974 3,783,591

INVENTORS
John B. Sotak and
Harold A. Williamson

INVENTORS
John B. Sotak and
Harold A. Williamson.

3,783,591

POWER MOWER SAFETY MECHANISM

Our invention relates to a power mower safety mechanism, and more particularly to a mechanically operated blade lifting assembly for selectively raising the grass cutting blade of a rotary type of power driven lawn mower.

The number of lawn mower accidents has reached alarming proportions and has caused the industries' trade group as well as the governmental authorities to pursue and to enact more stringent standards and regulations for alleviating this problem. Critics claim that approximately 150,000 persons are injured annually, and that of this number about 90 percent of the lawn mower accidents are caused by rotary types of power mowers. One major cause of accidents occurs when an operator inadvertently pulls the mower over his foot and causes severe injury to himself. A similar injury is caused when an operator falls on an embankment or slides on the freshly cut wet grass so that his foot slips under the lawn mower housing and the high speed rotary blade severs his toes and foot. Numerous lawn mower operators are also injured when they attempt to remove the clogged grass from underneath the lawn mower and inadvertently contact the high speed rotary blade with their hands. Others are injured by attempting to remove stones, twigs, and the like from under or near the skirted housing of the rotary mower. In addition, individuals are injured and property is damaged by flying objects hurled by the high speed rotating blade. For example, stones, nails, twigs, and other objects are projected by the rotary blade with bullet-like force. Thus, many severe injuries, such as lacerations and blindings, as well as several fatalities, are caused by objects propelled by rotary power mowers.

A further shortcoming of many conventional rotary power mowers is the scalping of the lawn. That is, when the rotating blade contacts a high spot on the lawn, the surface grass and part of the root system are chopped off by the rotating blade.

In addition, unobserved objects, such as rocks, tree stumps and other impediments cause costly damage to the rotary mower by dulling and unbalancing the blade or by bending the drive shaft of the engine.

Further, both pull and winding recoil types of engines are usually difficult to start in tall grass due to the resistance of the grass on the cutting blade.

Accordingly, it is an object of our invention to provide a rotary power mower which is safer, better, and easier to operate.

Another object of our invention is to provide a saftey mechanism for a rotary power mower wherein an operator may selectively raise and lower the cutting blade.

A further object of our invention is to provide a power mower with a safety mechanism which is cooperatively related with the skirted housing and the rotary cutting blade for selectively changing the distance between the underside of the skirted housing and the rotating cutting blade.

Still another object of our invention is to provide a mechanical arrangement cooperatively associated with a rotary blade of a power mower which allows the cutting blade to be moved adjacent the underside of the skirted housing when desired.

Still a further object of our invention is to provide a safety mechanism for a power mower which reduces the chance of injury to the operator or to nearby individuals and which decreases the possibility of damage to surrounding property.

Yet another object of our invention is to provide a mechanical safety arrangement for a rotary lawn mower which raises the cutting blade to allow for easier starting in high grassy areas.

Yet a further object of our invention is to provide a mechanical arrangement for a power mower which results in the blade being automatically raised when it engages a high spot in the lawn.

Still yet another object of our invention is to provide a safety mechanism which quickly and positively lifts the rotary blade of a power mower to allow for easier and safer starting and to reduce the chance of injury to individuals and property during grass cutting operation.

Still yet another object of our invention is to provide a novel blade lifting assembly for a power rotary mower which is economical in cost, simple in construction, reliable in operation, durable in use, and efficient in service.

Other objects and further features and advantages of our invention will become more fully evident from the following detailed description when considered in connection with the accompanying drawings wherein.

Briefly, our invention relates to a safety mechanism for a rotary power mower having a skirted protective housing carrying a power motor for driving a grass cutting blade. The safety mechanism includes a blade lifting device having a rotatable and axially movable spring biased spindle which has an upper enlarged portion. The grass cutting blade is secured to the lower end of the movable spindle, and a cam groove is formed on the peripheral surface of the upper enlarged portion of the movable spindle. A spring biased follower rod includes a conical roller which is disposed on one end thereof. An actuating device including a slidable wedge member is coupled to the other end of the cam follower rod. An operating device including a depending kick flap and a reset foot pedal is linked to the wedge member. When the depending flap is contacted by the foot of an individual, the wedge member is moved to its thin edge so that the spring biased cam follower rod moves the roller into engagement with the cam groove. The engagement of the roller with the cam groove quickly raises the spindle and, in turn, lifts the grass cutting blade substantially against the underside of the skirted housing. The individual may return the grass cutting blade to its lower grass cutting position simply by stepping of the reset foot pedal. The forward movement of the foot pedal causes the wedge member to move to its thick edge so that the cam follower rod and, in turn, the roller are withdrawn from the cam groove. The withdrawal of the cam roller allows gravity and the force of the spindle spring to move the grass cutting blade to its lower grass cutting position.

Figure 1:
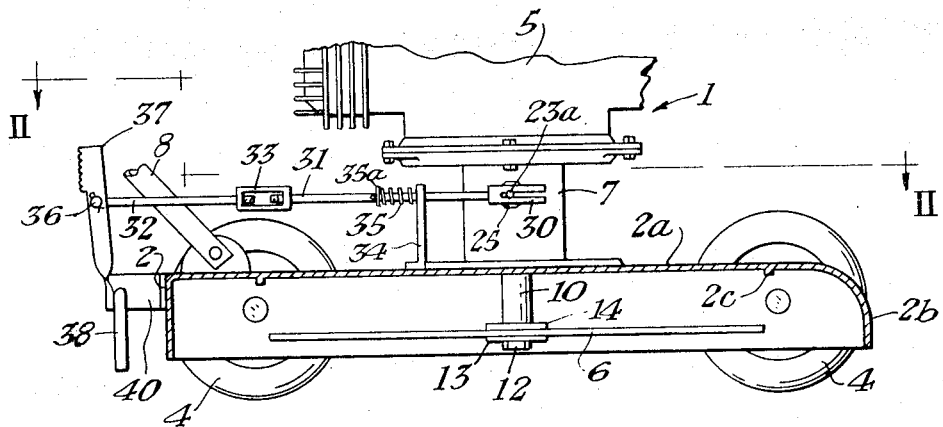
FIG. 1 is a side elevational view, partly in section, of the power driven rotary lawn mower utilizing the safety mechanism embodying our invention.
Figure 2:
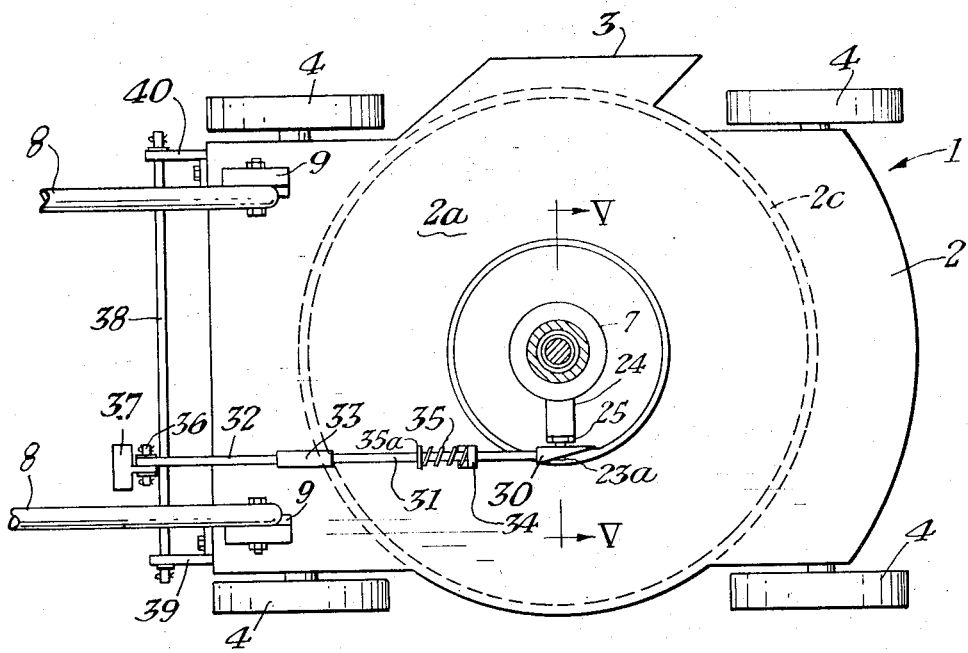
FIG. 2 is a top plan sectional view of a rotary type of the lawn mower taken along lines II—II of FIG. 1.
Figure 3:
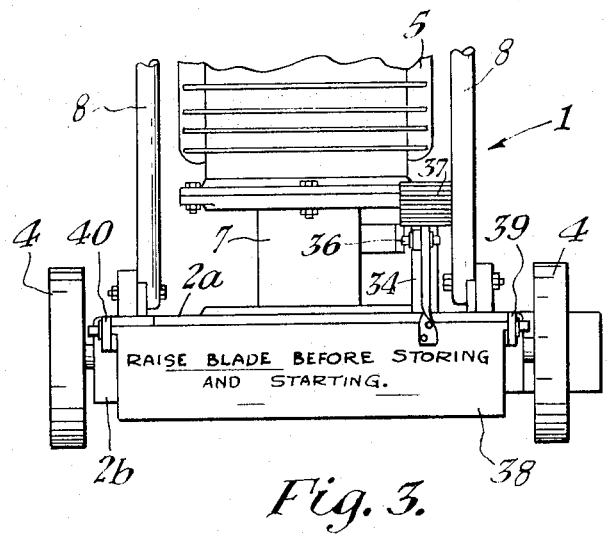
FIG. 3 is a rear elevational view of the power driven rotary lawn mower of FIGS. 1 and 2.

Referring now to the drawings and in particular to FIGS. 1, 2 and 3, there is shown a rotary type of power driven lawn mower generally characterized by the reference numeral 1. The rotary mower 1 includes a metallic protective housing 2 having an upper flat portion 2a and a peripheral skirt 2b which completely encompass the housing with the exception of an open grass-emitting chute 3. The underside of the housing 2 is provided with an annular ring or rim 2c which has a diameter slightly larger than the length of the grass cutting blade and a depth slightly larger than the thickness of the blade, as will be described hereinafter. Generally, the metallic housing is supported by four wheels 4 which allow the lawn mower to be pushed or propelled along its route of travel. A motor, such as a high speed gasoline engine 5, is conventionally employed to provide the necessary driving power for turning the rotary cutting blade 6. The engine 5 is generally located on top of the housing 2 and is suitably bolted to the housing 2. In the present case, the engine 5 is flange mounted on an upstanding hollow cylindrical sleeve or tubulure 7 which is shown formed as an integral part of the housing 2. Traditionally, the lawn mower 1 includes a guiding handle having a pair of depending arms 8, each of which is suitably secured to the back end of the housing 2. In the present instance, the lower ends of the arms 8 are pivotally connected to apertured lugs 9 by suitable fasteners, such as, bolts and nuts. As shown, the rotating cutting blade 6 is securely fastened to the end of a drive shaft 10, such as by a case hardened bolt 12 and a pair of oversized washers 13 and 14, or by some similar arrangement.

Figure 4:
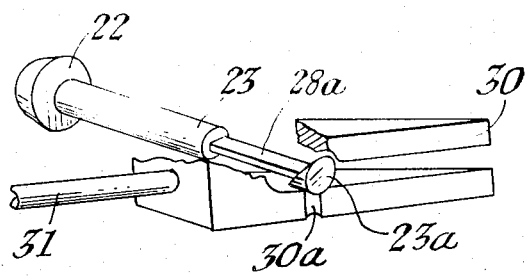
FIG. 4 is an enlarged fragmentary perspective view, partly in section, of the wedge operated cam follower employed in practicing our invention.
Figure 5:
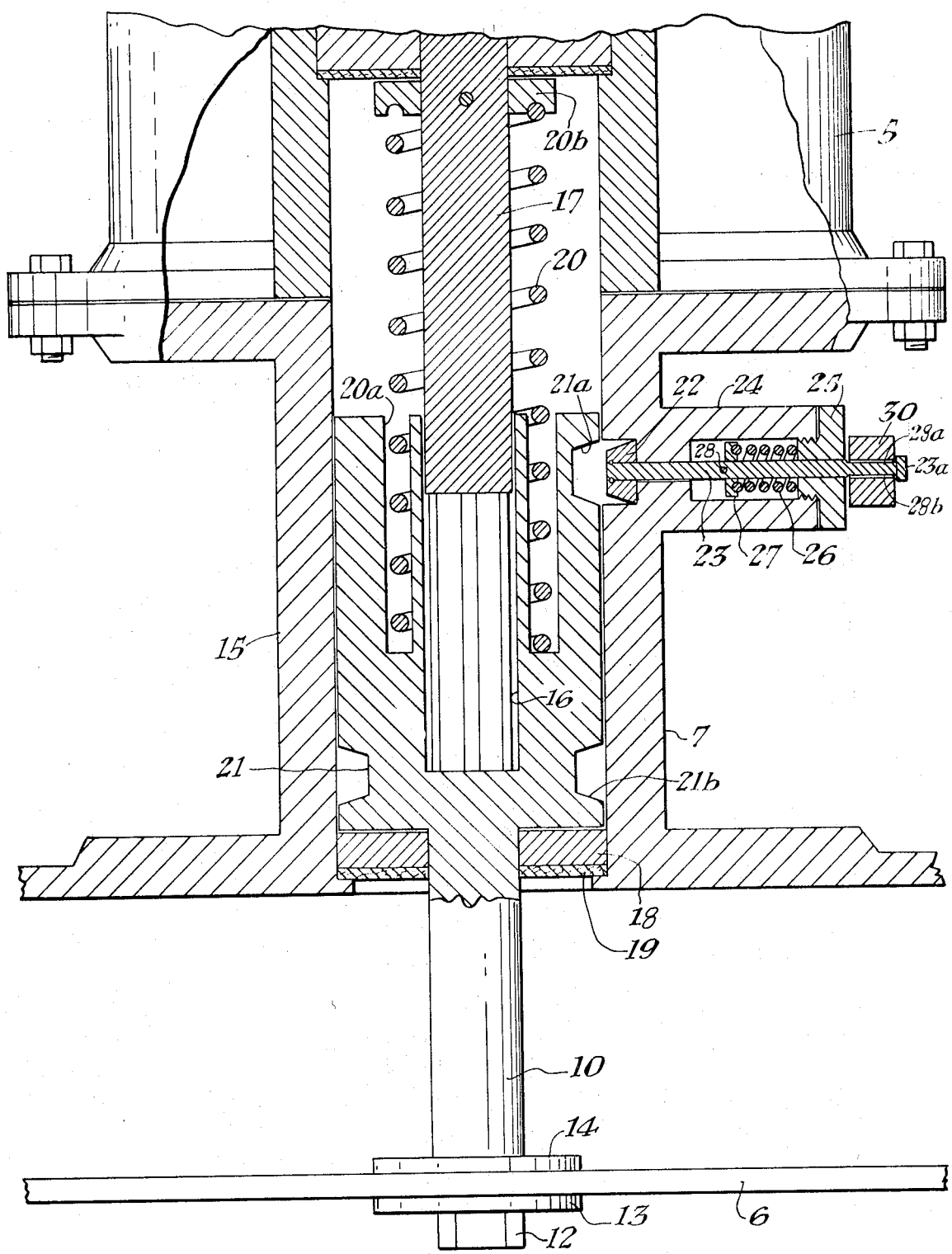
FIG. 5 is a greatly enlarged sectional view of the blade lifting device taken along lines V—V of FIG. 2.

A blade lifting assembly or device takes the form of a simple machine, namely, a cam and follower arrangement which is housed within the hollow tubulure 7. In viewing FIG. 5, it will be noted the spindle or shaft 10 includes an upper enlarged portion 15 which is disposed within the hollow cylindrical sleeve or tubulure 7. The enlarged spindle portion 15 includes a relatively deep centrally located splined bore 16 for accommodating an engine output shaft 17 which extends through a bearing and seal (not characterized) located in the bottom of the engine 5. The end of the output shaft 17 is also splined so that rotary movement is imparted to the shaft 10 and blade 6 when the engine is running. A suitable bearing member 18 and seal 19 are located within the lower end of the hollow portion 7. A spring 20 normally urges the spindle 10 downwardly so that the underface of the enlarged portion 15 bears against the upper face of bearing 18. As shown, the lower end of the spring 20 is disposed within an annular aperture or cylindrical bore 20a formed in the top of the enlarged portion 15. The upper end of the spring 20 is seated against an annular spring retainer 20b which is suitably fixed, such as, by a cotter pin, to the engine shaft 17. The outer peripheral surface of the enlarged portion 15 is provided with a conically shaped cam groove 21. The cam groove 21 includes a helical portion 21a which serpentines from top to bottom and merges with an annular circular portion 21b. The cam groove 21 is selectively engaged by a conical roller 22 rotatably mounted and suitably secured to one end of a cam follower rod 23 by a lock or retaining ring (not characterized). The cam follower rod 23 is disposed within a laterally extending cylindrical sleeve 24 formed on the side and near the upper end of the tubulure 7. The sleeve 24 includes an outer enlarged central hole and an inner reduced central hole which guides the follower rod 23. The outer open end of sleeve 24 is threaded to receive an apertured hexangular cap nut 25 which operates as a guide for the other end of the cam follower rod 23. Located internally of the enlarged central hole of sleeve 24 and surrounding the intermediate portion of rod 23 is a biasing spring 26 having one end engaging the inner surface of the cap member 25. The other end of spring 26 is seated against an annular retainer 27. In practice, the spring retainer is held in place on the cam follower 23 by means of a cotter pin which is fitted in hole 28. Thus, the cam follower rod 23 and roller 22 are normally urged inwardly toward the cam groove 21 by spring 26. As shown in FIGS. 4 and 5, the outer end of the cam follower rod 23 is provided with upper and lower flattened surfaces 28a and 28b. Thus, the upper and lower surfaces 28a and 28b form a guide for a slotted wedge type of actuating mechanism or device 30. In viewing FIGS. 4 and 5, it will be noted that the outer end of cam follower rod 23 cooperates with an elongated slot 29 formed by the tines of the wedge member 30. The spring 26 ensures that the head 23a of the rod 23 constantly engages the outer tapered surface of the wedge 30. The inner edges of the head 23a are slightly slanted from back to front to correspond with the tapered surface of the wedge 30. The outer tapered surface of the wedge 30 is provided with a groove or indentation 30a into which the head 23a is normally seated when the wedge 30 is moved to the wide end, namely, to its extreme forward position, as shown in FIG. 4. Movement of the wedge 30 is imparted by an operating device or mechanism through means of a linkage formed by rods 31 and 32 which are coupled together by an adjustable turnbuckle 33. A guide member 34 is suitably secured to the top of the housing 2 and holds the rods and wedge in the appropriate alignment with the end of follower rod 23. A biasing spring 35 normally urges the wedge and linkage arrangement rearward or to the left, as shown in FIGS. 1 and 2. The biasing spring 35 is held in compression between the guide member 34 and retaining washer 35a which is suitably held in place on rod 31. The free end of the rod 32 is pivotally connected by pin 36 to the intermediate portion of a foot pedal 37. The lower end of the foot pedal 37 is connected to a tripping device, such as, pivotal member or kick flap 38. The kick flap 38 is pivotally mounted by a pair of L-shaped brakcets 39 and 40, each of which is bolted to the back end of the skirt portion 2b of the housing 2. Preferably, the brackets 39 and 40 maintain the flap 38 sufficiently rearward of the mower housing so that the toes of an operator will not reach the tip of the rotary blade prior to the operator's skin engaging the flap. Thus, the flap, pedal, linkage and wedge member move as a unitary structure to control the position of the cam follower and, in turn, the position of the spindle and blade.

Generally during mowing operations, the blade 6 will occupy its lower grass cutting position as shown in FIGS. 1 and 5. Thus, the weight of the blade 6 and spindle 10 and the force fo the spring 20 will cause the blade lifting mechanism to assume a position as shown in FIG. 5. Under this condition the cam follower is withdrawn and is held in its disengaging position by the thick edge or end of the wedge 30. That is, the head 23a of the cam follower rod 23 is resting in groove 30a so that the biasing force of the spring 26 is unable to move the cam follower roller 22 into engagement with the cam groove 21. Further, it will be appreciated that the engagement between head 23a and groove 30a resists the biasing efforts of spring 35 so that linkage will remain in the position as shown in FIGS. 1 and 2.

Let us assume that the operator continues cutting grass and that he observes a mound, a rock, or tree stump in his path of travel. Under such a circumstance the operator simply kicks or moves the flap member 38 forward. The forward movement of flap 38 causes counterclockwise rotation of the foot pedal 37. The rotational movement of the foot pedal 37 causes the linkage to shift toward rearward or to the left as shown in FIGS. 1 and 2. The initial shifting of the linkage separates the head 23a from the groove 30a so that the spring 35 quickly moves the wedge 30 rearward, namely, to the left as viewed in FIGS. 1 and 2. The thin edge of the wedge 30 now allows the spring 26 to quickly move the roller 22 into engagement with the upper end of helical portion 21a of the conical cam groove 21. The conical roller 22 rapidly follows the serpentine groove 21a and in half a revolution, or less, the roller 22 is riding in annular groove 21b. Thus, the rotating blade is quickly lifted from its lower grass cutting position to its upper position substantially against the undersurface of the housing 2 and within the area defined by rim 2c. Hence, as the mower passes over the obstruction no damage will result to the blade or to the lawn mower itself and no danger from flying objects will arise to the operator or other individuals in the area. The roller 22 will continue to follow the annular groove 21a and will maintain the rotating blade in its upper position so long as no action is taken on the part of the operator. When the dangerous condition no longer exists, the operator simply needs to step on and push the reset foot pedal 37 forward. Such action causes the flap 38 to move in a clockwise direction and again assume a position as shown in FIGS. 1 and 2. The oushing of the pedal 37 also causes the linkage and in turn the wedge 30 to move forward to a point where head 23a again engages groove 30a. Thus, the thick edge withdraws the cam follower rod 23 and roller 22 from the lower annular cam groove 21b. The withdrawal of the roller 22 causes the blade 6 and spindle 10 to drop under their own weight and with the assistance of spring 20 so that the blade again assumes its lower grass cutting position. Thus, the cutting blade 6 is quickly and safely lifted out of possible contact with an obstruction and is subsequently easily returned to its grass cutting position when the dangerous condition no longer exists. It will be appreciated that there is little, if any, inconvenience to the operator since the blade does not stop rotating and the engine does not stop running.

Substantially, the same type of action or operation takes place when an operator's foot accidentally slides toward the housing on an embankment or on wet grass, or when the operator inadvertently pulls the lawn mower over his foot. As soon as the operator's foot engages or touches the flap 38, the blade 6 is quickly lifted up substantially against the underside of the housing 2 and into the circular recess formed by the rim 2c. The rim 2c lessens the chances of severe injury to an operator's foot since the ends and tips of the cutting blade are not exposed. In practice, it is desirable to let the blade be lifted to within a fraction of an inch, preferably about one eighth inch or so from the underside of the housing 2 in order to maximize the amount of protection to the operator.

It has been found that the blade lifting mechanism also assists in preventing damage to the mower when an unseen obstruction is inadvertently passed over. When a mound or a rock or the like is contacted by the blade, an upward force is imparted to the blade so that the spindle 10 raises slightly and moves over the obstruction. That is, the spring 20 allows the rotating blade 6 and spindle 10 to move upwardly due to the vertical component of the kinetic energy upon impact, and thus little, if any, damage will result to the mower and the operator and individuals in the area are in less danger of being hit by projected objects.

Further, less danger and difficulty is encountered in starting the lawn mower, particularly in high grass. Prior to attempting to start the engine, the operator may simply kick the depending flap 38 so that the wedge moves to its thin edge. Now the wedge permits the cam follower and roller 22 to enter the helical cam groove 21a upon the initial revolution of the engine 5. Thus, the conical roller 22 follows the helical groove 21a and raises the blade 6 to its uppermost position. With a raised blade the operator is obviously less likely of being injured, and the blade is normally out of contact with the high grass so that easier starting results. After starting, the blade may be moved to its lower grass cutting position by simply standing on the reset foot pedal 37. Thus, the operating mechanism controls the blade actuating mechanism to selectively raise and lower the grass cutting blade as desired.

It will be appreciated that each time the cutting blade is moved to its raised or upper position any debris, such as, grass clippings and the like, logged or attached to the underhousing is swept away by the high speed cutting blade. Thus, the operator may periodically and preferably prior to storage raise the blade for cleaning the underside of the housing 2. The cleaning operation of the blade not only facilitates the cutting of the grass by continually providing an unimpeded path to the discharge chute but also provides a convenient method of removing any remanent grass clippings after each usage of the mower.

It will be understood that various changes, modifications and alterations may be made to the presently described arrangement without departing from the spirit and scope of our invention. For example, the tubulure 7 may be a completely separate member which can be bolted to the top of housing 2 so that existing lawn mowers may be equipped with the presently described blade lifting arrangement. In many existing lawn mowers a key and slot are employed for preventing relative rotational movement between the blade and motor output shaft and, therefore, it is apparent that the central bore of the enlarged portion 15 may be simply provided with a long slot or keyway for accommodating a key rather than being splined as shown. Likewise, the central bore may be designed to correspond with other shapes of shafts and coupling arrangements presently employed by the industry.

In addition, it is apprent that the underside of the housing should be contoured to the shape of the blade and the type of coupling employed so that it may be raised as close as possible to the underside of the housing to maximize the protective cleaning and starting qualities derived from our invention.

Further, it is understood that other mechanical means may be employed for lifting the blade, for actuating the blade lifter and for operating the actuator.

It is further understood that our invention is not limited to usage for hand-pushed or self-propelled walking mowers but also may be utilized on riding types of rotary lawn mowers.

Therefore, the details herein shown and described have been given only for clarity purposes, and the breadth and scope of our invention is only limited by the claims annexed hereto.

Having thus described our invention, what we claim is:

1. A safety mechanism for a rotary type of motor driven lawn mower, comprising, a movable spindle housed within a tubulure carried by the housing of the lawn mower, a cutting blade attached to one end of said movable spindle and an output shaft of the motor of the lawn motor drivingly coupled to the other end of the movable spindle, a cam groove formed on the peripheral surface of the other end of said movable spindle, a movable cam follower mounted in a sleeve member carried by said tubulure, a wedge member normally having its thick end in engagement with said cam follower, and a pivotal kick member mounted behind the housing of the lawn mower and linked to said wedge member so that pivotal movement of said kick member causes said wedge member to move its thin edge into engagement with said cam follower whereby the cam follower is permitted to become engaged with said cam groove which thereby causes the movable spindle to be lifted upward so that the cutting blade is raised substantially adjacent the underside of the housing of the lawn mower.

2. A safety mechanism for a rotary type of motor driven lawn mower as defined in claim 1, wherein said cam groove includes a helical groove extending from the top of said other end of said movable spindle and terminating into an annular groove formed on the bottom of said movable spindle.

3. A safety mechanism for a rotary type of motor driven lawn mower as defined in claim 1, wherein said wedge member includes a slot which accommodates one end of said cam follower.

4. A safety mechanism for a rotary type of motor driven lawn mower as defined in claim 1, wherein a reset foot pedal is coupled to said kick member for moving said wedge member to its thick edge so that said cam follower is disengaged from said cam, thereby allowing said movable spindle to fall and causing said cutting blade to assume a grass cutting position.

5. A safety mechanism for a rotary type of motor driven lawn mower as defined in claim 1, wherein said cam follower includes a conical roller for engaging said cam groove.

6. A safety mechanism for a rotary type of motor driven lawn mower as defined in claim 1, wherein a compression spring is disposed within said tubulure and noramlly urges said cutting blade to a grass cutting position.

7. A safety mechanism for a rotary type of motor driven lawn mower as defined in claim 3, wherein an indentation is formed on the thick edge of said wedge member for holding said one end of said cam follower.

8. A lawn mower comprising, a skirted housing, a power motor mounted on said skirted housing, a rotary cutting blade driven by said power motor, and a safety mechanism including a foot operated device, an actuating device and a blade lifting assembly, said blade lifting assembly supported by said skirted housing, said foot operated device movably mounted to said skirted housing, said actuating device connected between said foot operated device and said blade lifting assembly, and said blade lifting assembly including a first means and a second means operatively associated to said cutting blade, said actuating device including a third means cooperatively engaged with said second means for shifting said second means into engagement with a first means for raising said rotary cutting blade and for shifting said second means out of engagement with said first means for lowering said rotary cutting blade.

9. A lawn mower as defined in claim 8, wherein a linkage is coupled to said third means for moving said third means between a first and a second position.

10. A lawn mower as defined in claim 8, wherein said blade lifting assembly includes a spring which urges said rotary cutting blade to a lower grass cutting position.

11. A lawn mower as defined in claim 8, wherein an annular rim is formed on the underside of said skirted housing.

12. A lawn mower comprising, a skirted housing, a motor mounted on said skirted housing, a cutting blade powered by said motor, a safety mechanism including a foot operated device, an actuating device and a blade lifting assembly, said blade lifting assembly carried by said skirted housing, said foot operated device mounted to the rear of said skirted housing, said blade lifting assembly including a first and a second means operatively coupled with said cutting blade, said actuating device including a third means cooperatively engaged with said second means, and a linkage operatively connected to said third means for moving said third means and causing said first and said second means to raise said cutting blade substantially against the underside of said skirted housing.

* * * * *